United States Patent [19]

Siegenthaler

[11] Patent Number: 5,198,234

[45] Date of Patent: Mar. 30, 1993

[54] VEHICLE TIRE LOADING-UNLOADING AND STABILIZING DEVICE

[75] Inventor: Karl J. Siegenthaler, Rome-Ostia, Italy

[73] Assignee: Bridgestone/Firestone, Inc., Akron, Ohio

[21] Appl. No.: 725,847

[22] Filed: Jul. 3, 1991

[30] Foreign Application Priority Data

Jul. 27, 1990 [IT] Italy .................. 67593 A/90

[51] Int. Cl.⁵ .................................. B29C 35/02
[52] U.S. Cl. .................... 425/28.1; 425/38; 425/40; 425/41; 425/44; 425/50; 425/58.1
[58] Field of Search .............. 425/28.1, 38, 44, 40, 425/41, 50, 58.1

[56] References Cited

U.S. PATENT DOCUMENTS

| | | | |
|---|---|---|---|
| 2,066,265 | 12/1936 | Freeman | 264/501 |
| 3,008,180 | 11/1961 | Woodhall | 425/38 |
| 3,075,237 | 1/1963 | Soderquist | 425/44 |
| 3,170,187 | 2/1965 | Brundage | 425/38 |
| 3,214,791 | 11/1965 | Ericson et al. | 425/58.1 |
| 3,477,100 | 11/1969 | Pech et al. | 425/34.1 |
| 3,483,596 | 12/1969 | Ulm | 425/38 |
| 3,495,296 | 2/1970 | Ericson et al. | 425/29 |
| 3,621,520 | 11/1971 | Ulm | 425/38 |
| 3,645,660 | 2/1972 | Hugger et al. | 425/445 |
| 3,667,881 | 6/1972 | Cimprich | 425/58.1 |
| 3,692,444 | 9/1972 | Hugger et al. | 425/587 |
| 3,712,769 | 2/1969 | Cimprich | 425/38 |
| 4,092,090 | 5/1978 | Yuhas et al. | 425/58.1 |
| 4,447,385 | 5/1984 | Blosser et al. | 425/38 |
| 4,452,577 | 6/1984 | Irie | 425/38 |
| 4,527,946 | 7/1985 | Singh et al. | 425/50 |
| 4,578,023 | 3/1986 | Irie | 425/38 |
| 4,702,669 | 10/1987 | Ichikawa et al. | 425/38 |
| 4,728,274 | 3/1988 | Siegenthaler | 425/44 |
| 4,747,765 | 5/1988 | Siegenthaler | 425/50 |

*Primary Examiner*—Willard Hoag
*Attorney, Agent, or Firm*—Ernst H. Ruf

[57] ABSTRACT

A vehicle tire loading-unloading and stabilizing device having a mobile loading-unloading unit designed to enter inside a tire curing unit for receiving a cured tire on an upper unit and, at the same time, releasing onto the curing unit a green tire loaded on a suspension unit located beneath and integral with the upper unit; the upper unit being a stabilizing unit enabling the cured tire to be inflated by means of a pressurized fluid, and to be cooled from the inside by forced circulation of the pressurized fluid.

11 Claims, 4 Drawing Sheets

VEHICLE TIRE LOADING-UNLOADING AND STABILIZING DEVICE

TECHNICAL FIELD

The present invention relates to a vehicle tire loading-unloading and stabilizing device.

BACKGROUND OF THE ART

In particular, the present invention relates to a device which may be employed to advantage for loading/unloading tires on/off a tire curing unit comprising an upper half mold, a lower half mold and a device for parting the two half molds at the end of each curing cycle; and wherein the two half molds are so formed that, when parted, the cured tire remains integral with the upper half mold.

When manufacturing tires, particularly vehicle tires having internal body plies formed from nylon cords or other synthetic fibers which shrink when cooled, it is now customary to subject each tire, upon extraction from the curing mold, to a stabilizing operation generally consisting in mounting the tire on a support, inflating it to a given pressure, usually of about 3 atmospheres, and maintaining this pressure long enough for the tire to cool from an initial temperature of about 180° C. to below a given temperature, usually of about 100° C.

Such a process, usually referred to as "post inflation", provides, not only for preventing the synthetic cords from shrinking, thus avoiding undesired distortion of the tire, but also for stabilizing the shape of the cords, which is extremely useful in terms of finished tire quality. Stabilizing cured tires, however, usually involves a number of drawbacks for the manufacturer, mainly due to the relatively long time required for cooling, and the size of currently used stabilizing equipment. Generally speaking, in fact, the time required at present for ensuring correct stabilization of a tire is roughly twice that required for curing. Consequently, two stabilizing machines are usually required for each curing mold, each of which usually features complex centralized systems for supplying cooling fluids such as water and/or air, for cooling the outer surface of the tires during stabilization.

SUMMARY OF THE INVENTION

The principal aim of the present invention is to provide a loading-unloading device designed to minimize the downtime involved on a tire manufacturing machine, particularly a curing unit of the aforementioned type, for loading and unloading the unprocessed or green and processed or cured tires respectively; and which also provides for relatively fast cooling of the tires extracted from the curing mold, with no need for centralized systems.

With this aim in view, according to the present invention, there is provided a device for loading-unloading and stabilizing vehicle, in particular motor vehicle, tires, characterized by the fact that it includes a mobile loading-unloading unit in turn including an upper unit for supporting a first tire, and a lower unit having means whereby to suspend a second tire; said upper unit being a stabilizing unit comprising means for supplying pressurized fluid inside said first tire and inflating the same to a given pressure; said supply means comprising a closed circuit for circulating said pressurized fluid, said circuit being defined at least partially by said first tire and including heat exchange means located outside said first tire, for cooling said pressurized fluid.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
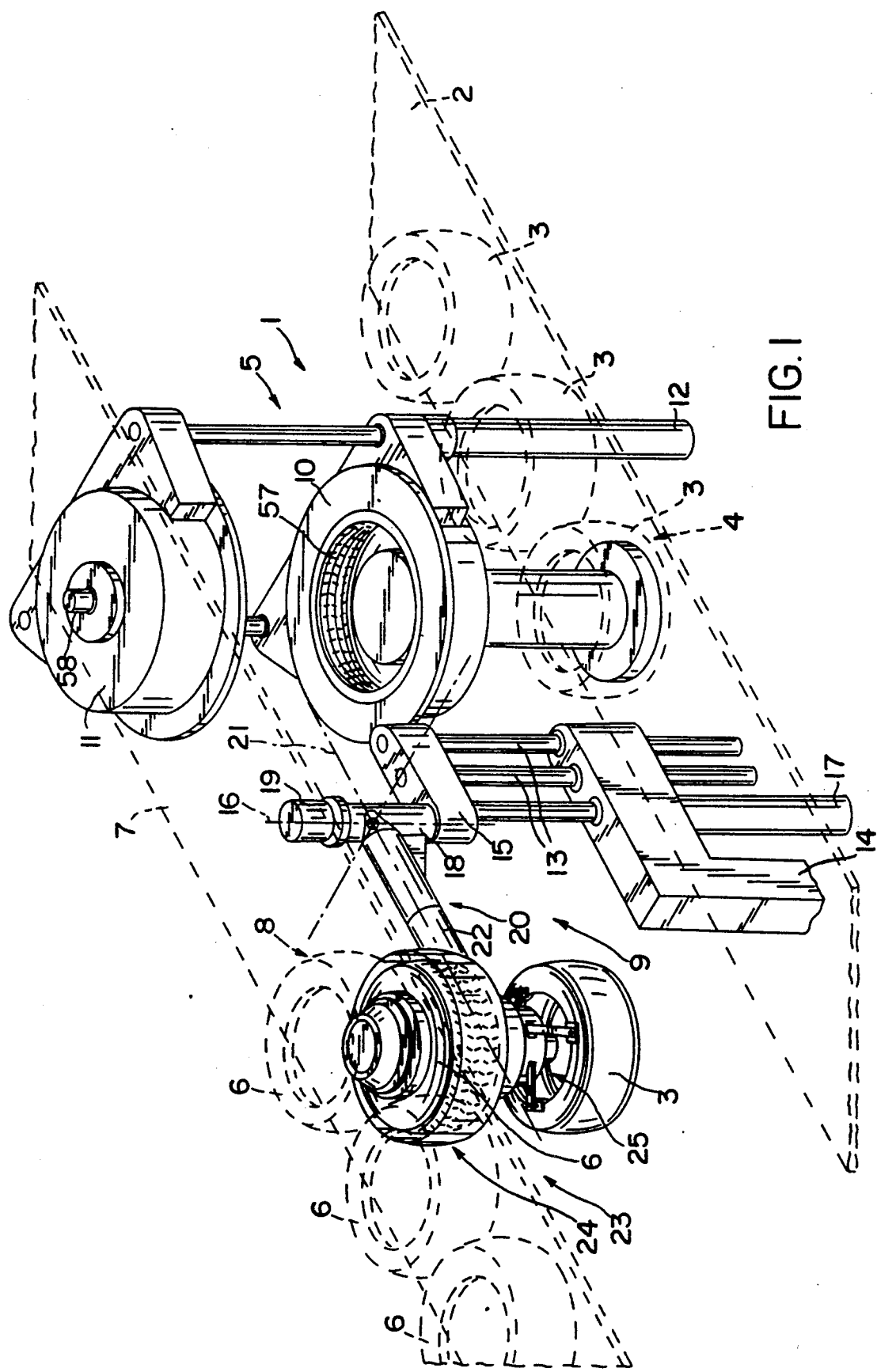
FIG. 1 shows a schematic view in perspective of a system comprising a preferred embodiment of the device according to the present invention.

Number 1 in FIG. 1 indicates a tire curing system comprising a conveyor 2 for successively feeding green tires 3 to a loading station 4; a curing unit 5 for receiving tires 3 and producing cured tires 6; a conveyor 7 for transferring tires 6 from an unloading station 8; and a loading-unloading and stabilizing device 9 for transferring both tires 3 from loading station 4 to curing unit 5, and tires 6 from curing unit 5 to unloading station 8.

Curing unit 5 is of known type as described, for example, in U.S. Pat. No. 4,747,765, the content of which is fully incorporated herein by reference. Unit 5 comprises a lower portion 10 and an upper portion 11 designed to move in relation to each other, by virtue of hydraulic lifting devices 12, between a closed curing position (not shown) and an open position (FIG. 1) for unloading cured tire 6 and loading green tire 3.

Device 9 comprises two guide columns 13 extending upwardly from a fixed base 14 and connected by an upper crosspiece 15 designed to move parallel to a vertical axis 16 in relation to base 14 by virtue of a hydraulic actuator 17. Crosspiece 15 is connected to a coupling 18 coaxial with axis 16 and connected to an actuator 19 so as to turn in relation to crosspiece 15 about axis 16. From coupling 18, there extends radially outwardly an arm 20 having an axis 21 perpendicular to axis 16, and comprising a first fixed portion integral with coupling 18, and a second portion 22 designed to turn in relation to coupling 18 about axis 21 by virtue of an angular actuator (not shown) housed inside the fixed portion of arm 20. Device 9 also comprises a mobile loading-unloading and stabilizing unit 23 connected integrally with the free end of portion 22 of arm 20.

Figure 2:
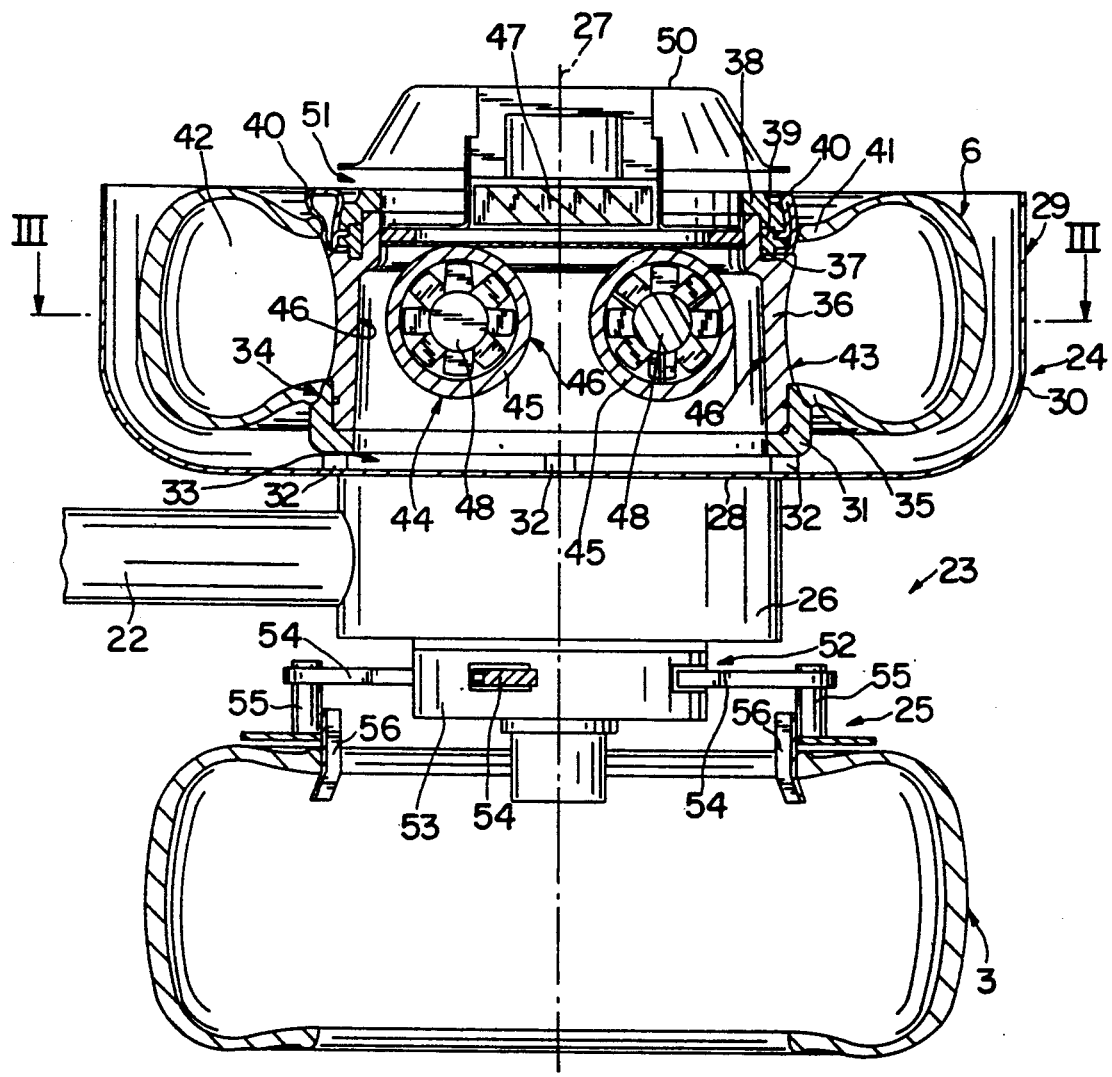
FIG. 2 shows an axial section of a detail in FIG. 1.
Figure 3:
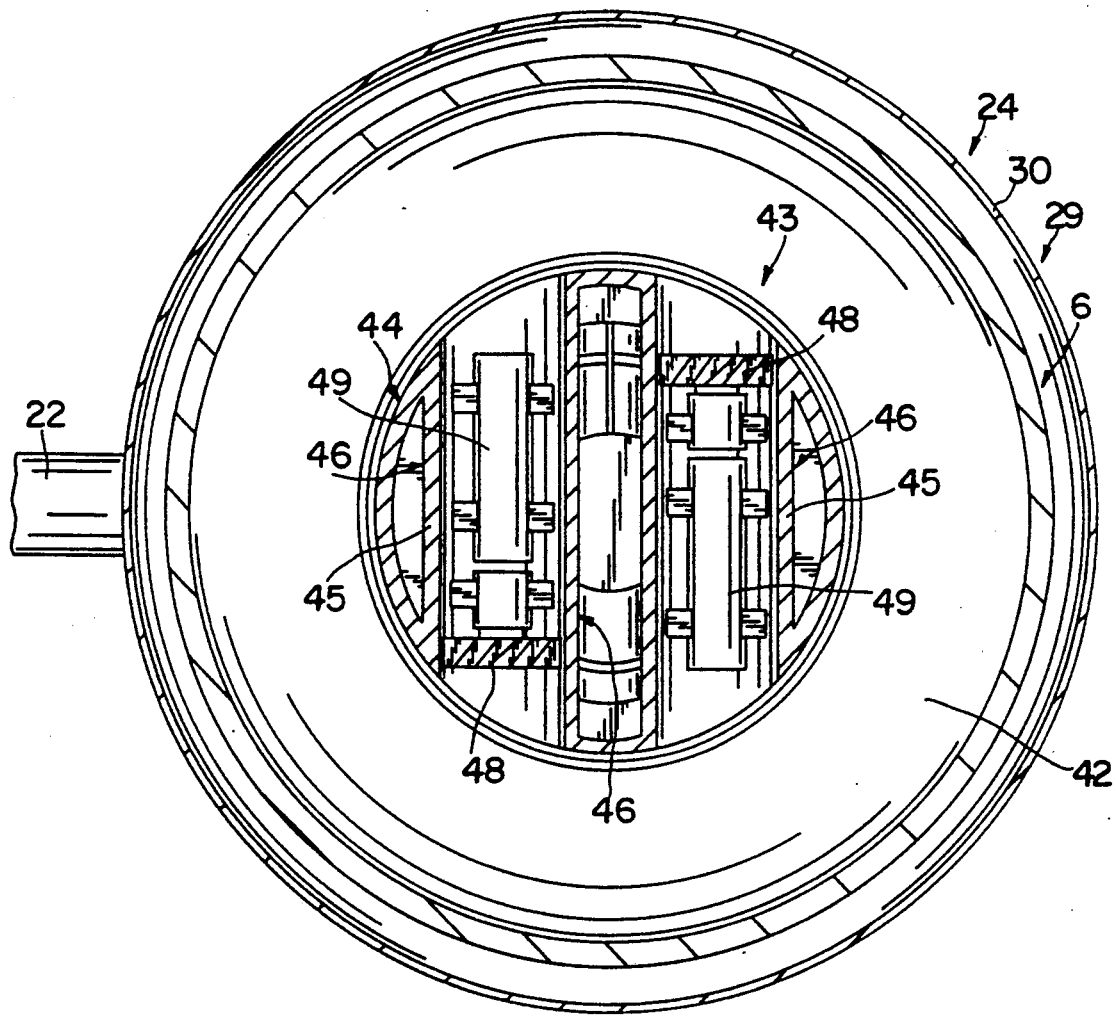
FIG. 3 shows a section along line III—III in FIG. 2.

As shown in FIG. 2, unit 23 comprises an upper unit 24 for supporting and stabilizing tire 6, and a lower unit 25 for suspending tire 3 coaxially with tire 6. As shown in FIGS. 2 and 3, unit 24 comprises a cylindrical body 26 integral with the free end of portion 22 of arm 20 and having a vertical axis 27. The top end of body 26 is fitted with the flat end wall 28 of a bell 29, the lateral wall 30 of which is bent upwardly and defines unit 24 laterally. Wall 28 supports an annular body via the interposition of a number of radial inserts 32 defining an annular passage 33 between wall 28 and the bottom end of annular body 31.

Annular body 31 presents, on its top end, an outer groove defining a seat 34 for a bead portion 35 of tire 6, and is engaged by a lower portion of a toroidal body 36 extending upwardly from annular body 31 and coaxial with axis 27. The top end of toroidal body 36 presents an annular groove 37 housing, in a known manner by means of upper ring 38, an annular foot 39 for an annular bladder 40 which, when deflated, and as shown to the right of axis 27 in FIG. 2, presents an outside diameter smaller than inside diameter of tire 6. When inflated, on the other hand, by means of a pressurized fluid supply device (not shown), bladder 40 constitutes an annular element for supporting and retaining in fluid-tight manner a bead portion 41 of tire 6.

When inflated and contacting tire 6 mounted on toroidal body 36, bladder 40 defines, inside tire 6, a toroidal chamber 42 forming part of a circuit 43 for circulating a heat exchange fluid fed at a given pressure inside circuit 43 by a known valve device (not shown) for inflating tire 6.

As shown more clearly in FIG. 3, circuit 43 comprises a radiator 44 defined by two parallel pipes 45 extending transversely in relation to axis 27 through toroidal body 36, and defining, inside toroidal body 36, three passages 46 parallel to axis 27 and communicating at the bottom with passage 33 and at the top with the delivery side of a powered fan 47 coaxial with axis 27 and connected to the top end of toroidal body 36. For circulating said heat exchange fluid along circuit 43, pipes 45 house respective oppositely-oriented powered fans 48. For increasing the heat exchange surface, pipes 45 also house respective inner conduits 49.

A bell type conveyor 50 conveys the outside air to the inlet of fan 47 through an annular opening 51 defined between ring 38 and the periphery of conveyor 50. Unit 25 is connected integrally with the bottom end of body 26, and comprises a known device 52 for gripping tire 3. Device 52 comprises, in known a manner, a central actuator 53 integral with the bottom end of body 26 and having a number of output rods 54 moving substantially radially between a withdrawn position (not shown) and an expanded position (as shown in FIG. 2). Each rod 54 is fitted on its free end with a pin 55 parallel to axis 27 and fitted on its bottom end with a substantially T-shaped bracket 56 designed to support and grip the bead portion of tire 3 and suspend tire 3 beneath body 26.

Operation of system 1 will be now described commencing from the startup stage wherein curing unit 5 and device 9 are empty, and a green tire 3 is fed by conveyor 2 to loading station 4. At this point, actuator 19 is operated for positioning unit 23 over tire 3, in loading station 4, and actuator 17 is operated for lowering unit 23, thus gripping tire 3, via gripping device 52, and raising unit 23 with tire 3 suspended on unit 25. Actuator 19 is then operated once more for moving arm 20 towards curing unit 5 and positioning unit 23 between upper and lower portions 11 and 10 already opened by hydraulic devices 12.

Once unit 23 is coaxial with portions 10 and 11 of curing unit 5, gripping device 52 is operated so as to withdraw rods 54 and deposit tire 3 inside lower half mold 57 on lower portion 10 of unit 5. Unit 23 is then withdrawn from unit 5, which is closed for curing tire 3 and thus producing cured tire 6. During the tire curing process, unit 23 is moved into station 4 for picking up another green tire 3 and transferring it to unit 5.

Upon completion of the curing process, portions 10 and 11 are parted by devices 12, which results, in a known manner, in tire 6 being detached from lower portion 10 and remaining attached to upper portion 11. Unit 23 is then inserted once more between portions 10 and 11, so that unit 24 is located beneath tire 6 attached to portion 11, and unit 25, to which the next green tire 3 is suspended, is located over lower half mold 57. At this point, the tire 3 is deposited onto half mold 57 by withdrawing rods 54 on device 52, and tire 6 is detached from portion 11 by a known extracting device 58 and deposited onto unit 24.

Prior to detaching tire 6 from upper portion 11, bladder 40 is deflated and arranged as shown to the right of axis 27 in FIG. 2. When detached from portion 11 of unit 5, tire 6 may thus locate on toroidal body 36, with tire bead portion 35 substantially engaging seat 34, and bead tire portion 41 facing annular foot 39. At this point, pressurized fluid is fed into bladder 40 so as to inflate it as shown to the left in FIG. 2, wherein bladder 40 axially locks and cooperates in substantially fluid-tight manner with bead portion 41.

By means of actuators 19 and 17, unit 23 is then withdrawn from curing unit 5 and moved over to unloading station 8, during which displacement and a subsequent stop in station 8, pressurized heat exchange fluid, preferably of about 3 atmospheres, is fed into circuit 43 to inflate tire 6 and engage bead portion 35 in a fluid-tight manner with seat 34. Fans 47 and 48 are then activated, the first for supplying a stream of air through radiator 44 and, via passage 33, over the outer surface of tire 6, and the second for circulating said pressurized fluid inside circuit 43 and cooling tire 6 relatively rapidly from the inside.

Once the required stabilizing temperature is reached, fans 47 and 48 are stopped, bladder 40 is deflated, and unit 23 is turned over, by rotating portion 22 of arm 20, so as to unload tire 6 onto conveyor 7. Unit 23 is then restored to its normal position, with unit 24 being upwardly directed and moved over to loading station 4 to pick up the next green tire 3 via device 52 and await the next unloading-loading cycle to take place at unit 5.

Figure 4:
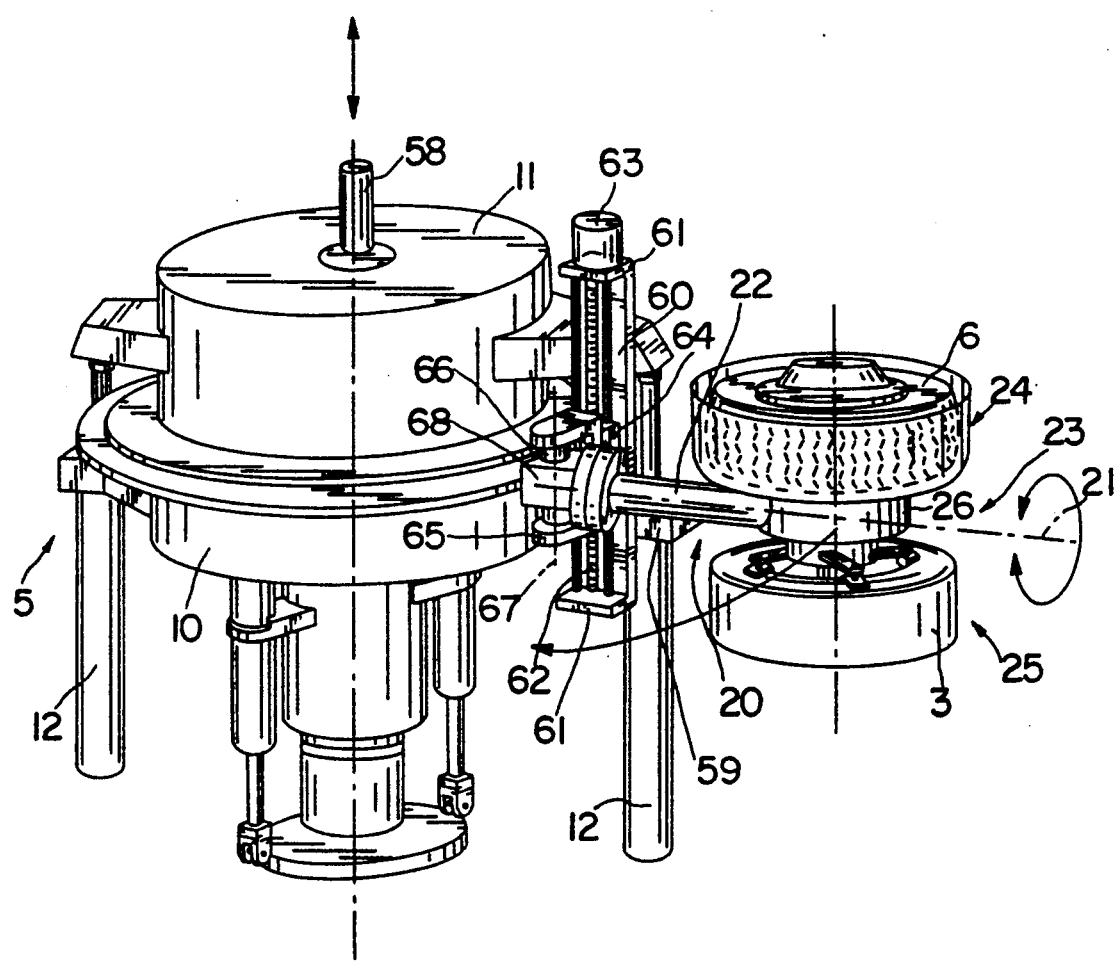
FIG. 4 shows a schematic view of a variation of a detail in FIG. 1, with parts removed for simplicity.

According to the variation shown in FIG. 4, instead of being supported independently, arm 20 is supported directly on curing unit 5. For this purpose, a vertical guide 60 is connected to an apron 59 fitted to lower portion 10 of unit 5 for connecting lifting devices 12. Guide 60 is defined, at its opposite ends, by two transverse plates 61 between which is mounted a rotatable screw 62 which, together with its drive motor 63, constitutes an actuator, similar to 17 in FIG. 1, for moving along guide 60 a slide 64 similar to crosspiece 15 and connected in a sliding manner to guide 60. Slide 64 is connected integrally with a fork 65 which supports a rotary pin 66 extending along an axis 67 corresponding with axis 26 in FIG. 1, and powered (in a manner not shown) so as to turn about axis 67. Pin 66 is connected integrally with the outer casing of an angular actuator 68 constituting a first portion of arm 20, the second portion 22 of which is connected to unit 23, extends along axis 21, and is designed to turn about axis 21 by virtue of actuator 68.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A device for loading-unloading and stabilizing vehicle tires comprising a mobile loading-unloading unit having an upper unit for supporting a first tire, and a lower unit having means whereby to support a second tire; said upper unit being a stabilizing unit including means for supplying pressurized fluid inside said first tire and inflating same to a given pressure; said supply means including a closed circuit means for circulating said pressurized fluid, said circuit means being defined at least partially by said first tire and including heat exchange means located outside said first tire, for cooling said pressurized fluid.

2. A device as claimed in claim 1 in which said heat exchange means includes a radiator and fan means for force feeding a stream of outside air through said radiator.

3. A device as claimed in claim 2 including conveying means for conveying part of said stream of outside air over the outer surface of said first tire.

4. A device as claimed in claim 3 in which said upper unit also includes supporting means designed to cooperate with said first tire for defining, together with same, a fluid-tight chamber; and in which said chamber forms part of said closed circuit for circulating said pressurized fluid; and means for force circulating said pressurized fluid contained within said circuit.

5. A device as claimed in claim 4 in which said supporting means includes an annular body having, at a first end, means for supporting a first bead portion of said first tire, and, at a second end, an annular bladder exparsible between a first and second outside diameter respectively, smaller and larger than the inside diameter of said first tire; said bladder, in use and when expanded, engaging in a fluid-tight manner a second bead portion of said first tire.

6. A device as claimed in claim 5 in which said upper and lower units are coaxial.

7. A device as claimed in claim 6 including fixed supporting means for said mobile loading-unloading unit; and activating means for moving said mobile loading-unloading unit through a processing unit and between a loading station, wherein said second tire is loaded and an unloading station, wherein said first tire is unloaded.

8. A device as claimed in claim 7 in which said activating means includes guide means extending from said supporting means along a first axis; slide means mounted in sliding manner along said guide means; and an arm extending along a second axis, supported on said slide means so as to turn in relation to same about said first axis, and connected to said mobile loading-unloading unit.

9. A device as claimed in claim 8 including rotation means for turning said mobile loading-unloading unit about said second axis.

10. A device as claimed in claim 9 in which said supporting means includes said processing unit.

11. A device as claimed in claim 10 in which said processing unit is a curing unit including an upper portion, a lower portion, and means for parting said two portions at the end of each curing cycle; and wherein said two portions are so formed that, when parted in use, the cured tire remains integral with said upper portion; said cured tire constituting said first tire, and said second tire being a green tire.

* * * * *